Oct. 10, 1961  D. F. BENNETT  3,003,655
BOAT TRAILER
Filed July 17, 1959  3 Sheets-Sheet 1
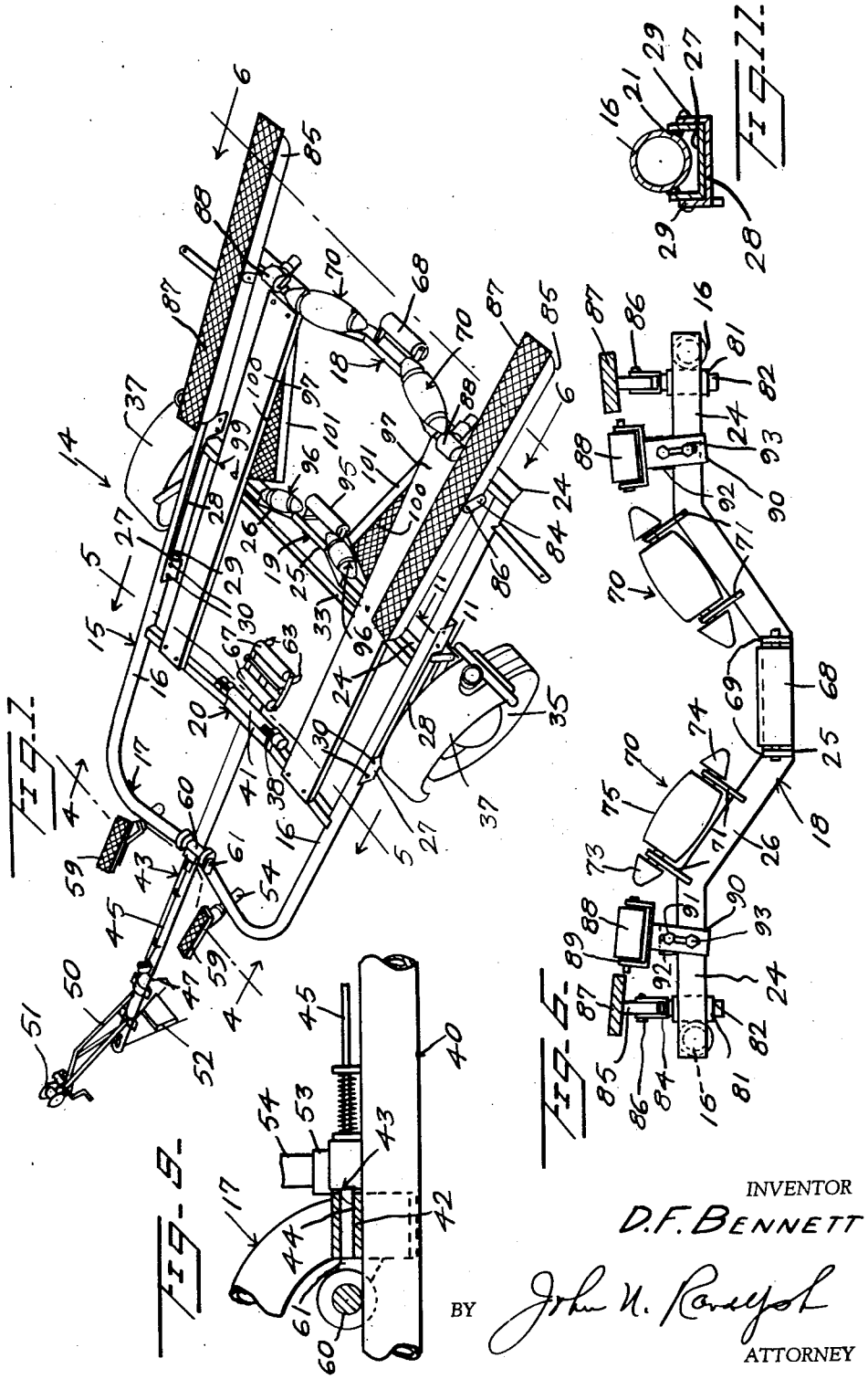
INVENTOR
D. F. BENNETT
BY John N. Randolph
ATTORNEY

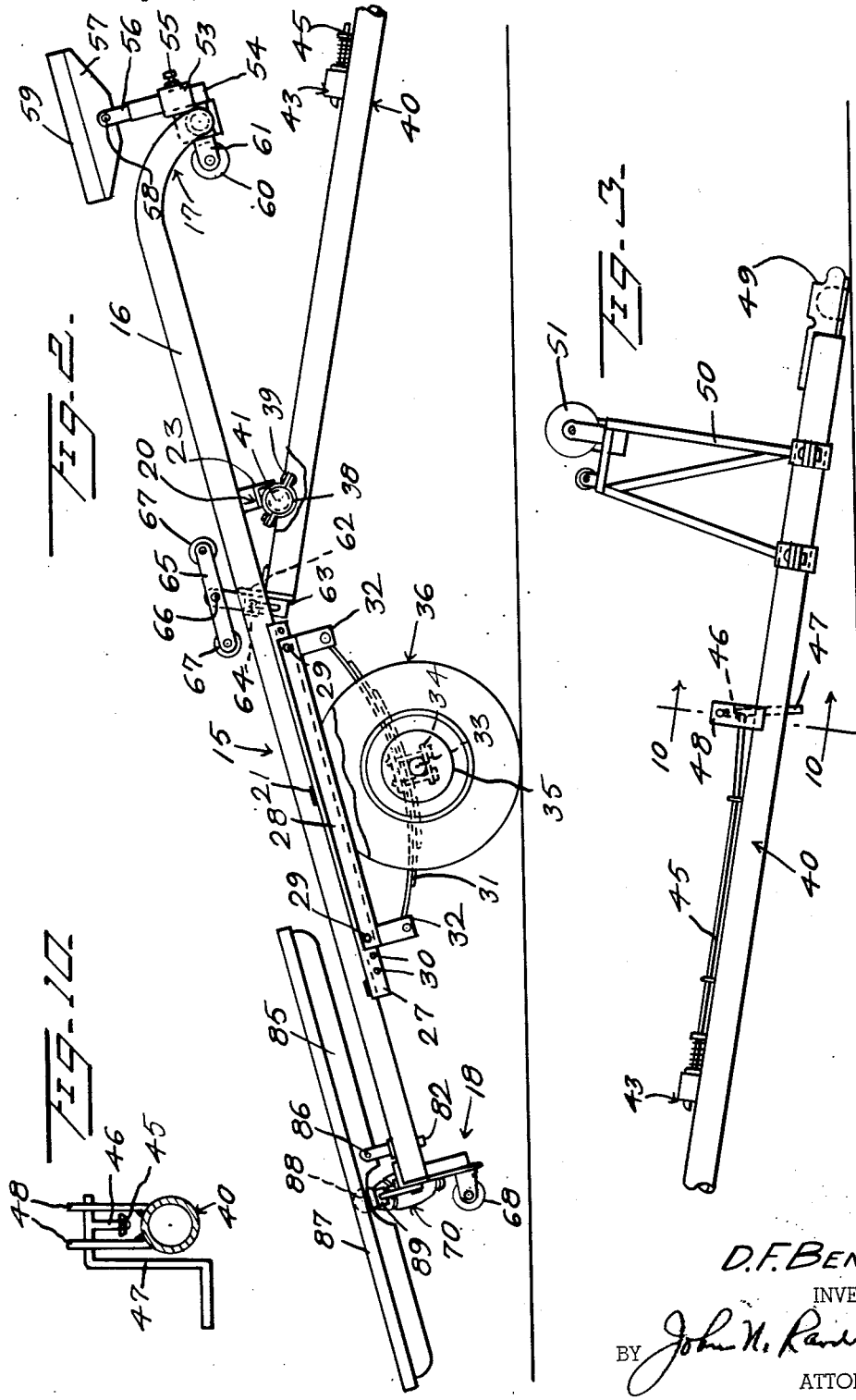

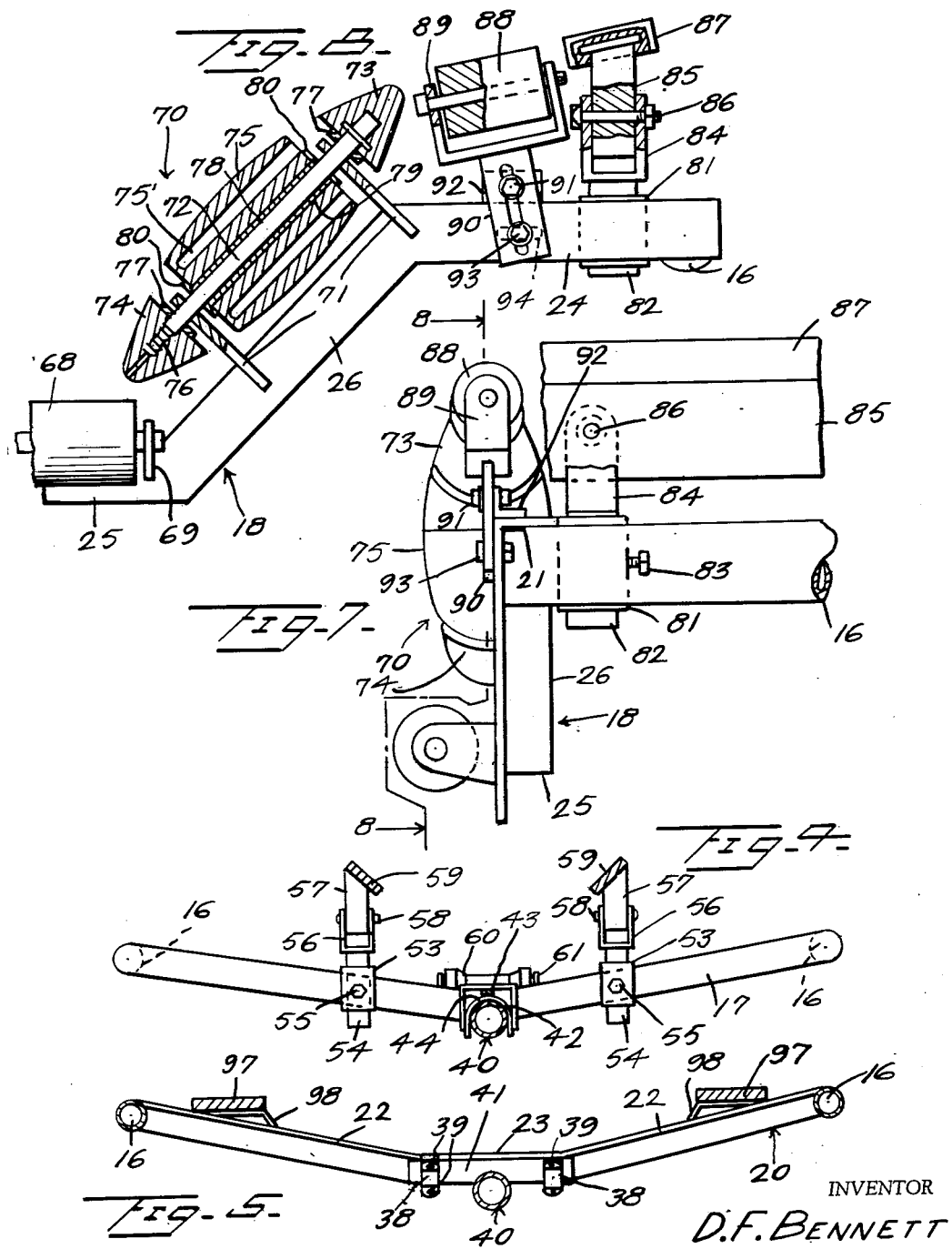

United States Patent Office 3,003,655
Patented Oct. 10, 1961

3,003,655
BOAT TRAILER
David F. Bennett, 1100 Fleetwood St.,
Daytona Beach, Fla.
Filed July 17, 1959, Ser. No. 827,749
2 Claims. (Cl. 214—506)

This invention relates to a novel boat trailer adapted to be hitched to and drawn by an automobile or similar motor vehicle and which is capable of effectively supporting a small boat, especially a boat having a V-shaped bottom.

Another object of the invention is to provide a boat trailer including a frame which may be readily tilted to facilitate loading and unloading a boat, without disconnecting the trailer from its draft vehicle.

Another object of the invention is to provide a boat trailer having a specially designed cross bracing of the frame thereof and specially designed roller and guide means associated with the cross bracing for supporting a boat while being moved longitudinally of the trailer frame, in either loading or unloading the boat.

A further object of the invention is to provide a boat trailer having means adjustably supported by the trailer frame for engaging boat hulls of different shapes, to provide a firm support for the boat on the trailer, and which will afford adequate protection for the boat hull.

Another object of the invention is to provide a boat trailer including a running gear adjustable lengthwise relative to the trailer frame for varying the balance of the trailer to compensate for boats of different lengths or for boats having a preponderance of weight adjacent one or the other end thereof.

Still a further object of the invention is to provide a boat trailer having a unique construction of supporting rollers over which a boat hull may ride in being propelled onto or off of the trailer and by which the hull will be guided and protected against injury during movement relative to the trailer frame.

Various other objects and advantages of the invention will hereinafter become more fully apparent from the following description of the drawings, illustrating a presently preferred embodiment thereof, and wherein:

FIGURE 1 is a perspective view of the boat trailer, looking toward the left rear end thereof;

FIGURE 2 is an enlarged fragmentary side elevational view, partly broken away, showing the boat trailer positioned for loading or unloading;

FIGURE 3 is a view similar to FIGURE 2 showing the forward portion of the trailer tongue, omitted from FIGURE 2, and as it will appear with the rear portion of said tongue disposed as seen in FIGURE 2;

FIGURE 4 is an enlarged cross sectional view taken substantially along the line 4—4 of FIGURE 1;

FIGURE 5 is a similar view, taken substantially along the line 5—5 of FIGURE 1;

FIGURE 6 is an enlarged cross sectional view, taken substantially along the line 6—6 of FIGURE 1;

FIGURE 7 is an enlarged fragmentary side elevational view, partly broken away, of a rear portion of the trailer;

FIGURE 8 is a fragmentary vertical sectional view, taken substantially along the line 8—8 of FIGURE 7;

FIGURE 9 is a fragmentary longitudinal sectional view, primarily in side elevation, showing a part of the trailer tongue and a part of the trailer frame to which the tongue is latched in a transport position of the trailer;

FIGURE 10 is an enlarged cross sectional view, taken substantially along a plane as indicated by the line 10—10 of FIGURE 3; and FIGURE 11 is an enlarged fragmentary cross sectional view in detail, taken substantially along a plane as indicated by the line 11—11 of FIGURE 1.

Referring more specifically to the drawings, the boat trailer in its entirety is designated generally 14 and includes a frame, designated generally 15, having spaced substantially parallel frame sides 16 which are preferably tubular, as seen in FIGURE 5, and which have inturned downwardly inclined forward ends which join with one another to form a front cross brace 17 of the frame. The frame 15 additionally includes a rear cross brace 18 which extends between and is secured at its ends to the rear ends of the frame sides 16, a rear intermediate cross brace 19 and a forward intermediate cross brace 20. Said cross braces 19 and 20 are likewise secured at their ends to the frame sides 16 and are spaced from one another and from the front cross brace 17 and rear cross brace 18. The cross braces 18, 19 and 20 may be secured, as by welding, as seen at 21 in FIGURE 7, to the frame sides 16. Each of said cross braces 18, 19 and 20, like the cross brace 17, is substantially V-shaped, so that the frame 15 is of substantially V-shaped cross section from end-to-end thereof. The cross brace 20, as seen in FIGURE 5, has downwardly and inwardly inclined end portions 22 and a substantially horizontal intermediate portion 23. The cross braces 18, 19 and 20 are each preferably formed of angle iron, as best illustrated in FIGURE 7. The rear cross brace 18 and the cross brace 19 each includes substantially horizontal end portions 24 which are disposed approximately coplanar with the frame sides 16, a downwardly offset substantially horizontal intermediate portion 25, and downwardly and inwardly inclined portions 26 extending between and connecting the intermediate portion 25 to the end portions 24.

The frame sides 16, approximately intermediate of their ends, have rails 27, secured as by welding, as seen at 21, to the undersides thereof. Said rails 27 are of U-shape cross section. Elongated channel members 28 engage the rails 27, as best seen in FIGURE 11, and are secured thereto by fastenings 29 which engage selected openings 30 in the sides of the rails 27. Conventional half elliptic springs 31 are connected at their ends to hangers 32 which extend downwardly from the ends of the channel members 28. Intermediate portions of the springs 31 rest upon an axle 33 and are secured thereto by conventional clamps 34. Ground engaging wheels 35, equipped with rubber tires, are journaled on the ends of the axle 33, in transverse alignment with one another, and are spaced outwardly from the frame sides 16. Said channel members, the springs, axle and wheels combine to form a running gear 36 of the trailer 14. The openings 30 for selectively receiving the fastenings 29 enables the running gear 36 to be adjusted forwardly or rearwardly relative to the frame 15 for varying the fulcrum point of the frame and to accommodate the trailer to boats of different lengths or boats having different weight distributions. The running gear 36 may include wheel fenders 37 which may be suitably attached to any convenient part of the running gear and disposed over the upper halves of the wheels 35, as seen in FIGURE 1.

The intermediate portion 23 of the cross brace 20 has corresponding halves of two clamps 38 secured to the under and rear side thereof. Each of the clamps 38 includes a detachable rear half attached to the front half of said clamp, which is secured immovably to the brace 20, by fastenings 39. A trailer tongue 40, which is preferably tubular, has a cross member 41 fixed thereto adjacent the rear end thereof. The cross member 41 is of circular cross section and the end portions thereof fit turnably in the clamps 38 for pivotally connecting the tongue 40 to said cross brace 20. The front cross brace 17 is provided intermediate of its ends with a downwardly opening arch shaped portion 42, as best seen in FIGURES 4 and 9, in which a portion of the tongue 40 seats in a raised position of said tongue, as seen in FIGURES 1, 4 and 9. A spring projected latch 43 is slidably mounted on the upper side of the tongue 40, forwardly of the cross brace 17, and is urged rearwardly by the spring thereof to normally engage a stationary keeper 44 of the front cross brace 17, for latching the tongue in its raised position to the forward end of the trailer frame. A pull rod 45 is connected to and extends forwardly from the spring projected latch 43 and has its forward end pivotally connected to a lever arm 46 of a manually actuated crank 47. Said crank 47 is journaled in bearing elements 48 which are secured to and rise from a forward portion of the tongue 41, as best seen in FIGURE 10. The crank 47 can be swung forwardly for retracting and disengaging the spring latch 43 from the keeper 44 to allow the tongue to swing downwardly relative to the frame 15 about its pivot 38, 41.

The forward end of the tongue 40 is provided with a conventional coupling element 49 by which the tongue may be coupled in a conventional manner, not shown, to a coupling of a draft vehicle. A frame 50 is preferably secured to and extends upwardly from the tongue 40, between the coupling element 49 and the crank 47, to support a winch 51 of any conventional construction. A prop 52 is shown in FIGURE 1 supporting the forward end of the tongue 40; however, said prop constitutes no part of the invention and would only be utilized when the trailer 14 was disconnected from its draft vehicle, which normally provides the support for the tongue.

A pair of sleeve members 53 are secured in upright positions to the front cross member 17 on opposite sides of and spaced from the arch 42. A post 54 is adjustably secured by a setscrew 55 in each sleeve 53. Each post 54 has an upstanding bifurcated portion 56 in which an intermediate portion of a bar 57 is pivotally mounted by a fastening 58. The bars 57 constitute parts of elongated cradle blocks having elongated downwardly and inwardly inclined top portions 59 which are padded. A spool shaped roller 60 is rotatably supported in journals 61 which extend upwardly and rearwardly from the intermediate portion of the front cross brace 17.

A bracket 62 is secured to the rear end of the tongue 40 behind and spaced from the pivot 38, 41 and is disposed transversely of said tongue. Supporting posts 63 are adjustably secured to and extend upwardly from the ends of the bracket 62 and may be vertically adjusted relative to said bracket in any conventional manner as by slot and fastening connections 64. Bars 65 are pivotally mounted by fastenings 66 intermediate of their ends on the upper ends of the posts 63 and rollers 67 are journaled between the ends of said bars 65, forwardly of and behind the pivots 66, so that said rollers will have up and down rocking movement.

The rear cross brace 18 is provided with a unique roller system, as best illustrated in FIGURES 1, 6, 7 and 8. Said roller system includes a straight cylindrical roller 68 which is journaled in bearings 69 which are secured to and extend rearwardly from the intermediate cross brace portion 25. Corresponding multiroller units 70 are supported at inclines downwardly and inwardly above the inclined portions 26 of the cross brace 18 by journal posts 71, two of which extend upwardly from each of said portions 26. The multiroller units 70 are substantially ellipsoidal in shape, or are shaped very similar to a football. Each of said units 70, as best seen in FIGURE 8, includes a shaft 72 which extends through and is journaled in the bearing posts 71, end rollers 73 and 74, and an intermediate roller 75. Said rollers are preferably formed of rubber and one end of the shaft 72 is molded in and projects from the flat inner side of the upper end roller 73 while the other end of said shaft is serrated as seen at 76 and secured by a press-fit connection to the lower end roller 74. Said end rollers 73 and 74 are substantially ogive shaped with the shaft 72 projecting from the flat inner sides thereof, which are located beyond but adjacent the bearings 71. Washers 77 are mounted on the shaft 72 between the flat inner sides of the rollers 73 and 74 and the bearings 71. The intermediate roller 75 is substantially longer than the end rollers 73 and 74 and the exterior thereof is substantially barrel shaped. The roller 75 has an axial bore 78 which is lined by a metal sleeve 79 which fits turnably on the shaft 72, so that said roller 75 can revolve independently of the end rollers 73 and 74. The sleeve 79 has outturned flanged ends 80 which bear against the flat ends of the roller 75 and which are disposed between said roller ends and the bearing 71. The roller 75 has a plurality of longitudinally extending bores 75' which open outwardly of one end of the roller and which extend substantially from end-to-end thereof and are disposed between the bore 78 and the periphery of the roller. The bores 75' reduce the weight of the roller 75 and also increase its yieldability.

An upright sleeve 81 is secured to the forward side of each end portion 24 of the cross brace 18 and to the inner side of the frame side 16 to which said end portion 24 is connected. A post 82 is adjustably secured in each sleeve 81 by a setscrew 83. Each post 82 has a bifurcated upper end 84 in which an intermediate portion of a bar 85 is pivotally mounted by a fastening 86. The bars 85, like the bars 57, form bottom portions of elongated cradle blocks which are provided with padded top portions 87 extending from end-to-end of the cradle blocks, and which top portions are inclined laterally downwardly and inwardly.

Between each cradle block 85, 87 and the adjacent multiroller unit 70, is adjustably mounted a straight cylindrical roller 88 which is journaled in a fork shaped bearing 89. The bearing 89 has a depending bar or post 90 which is longitudinally slotted to receive an upper nut and bolt fastening 91 which additionally extends through a bracket member 92, and a lower nut and bolt fastening 93 which engages a slot 94 in the vertical flange of the cross brace portion 24. The bracket 92 is fixed to and extends upwardly from said portion 24. The slotted post 90 can be slid vertically relative to the fastenings 91 and 93 and can be rocked relative to the upper fastening 91, since the lower fastening 93, when loosened, has sliding movement in the cross slot 94 as well as in the slot of the post 90. Thus, the bearing 89 and roller 88 can be adjusted vertically and angularly by the mounting as illustrated in FIGURE 8 and the fastenings 91 and 93 are tightened for clamping the bearing 89 in any desired adjusted position of the roller 88.

The cross brace 19 is provided with a roller 95, corresponding to and mounted in the same manner as the roller 68, behind the bottom intermediate portion 25 thereof. The upwardly and outwardly inclined portions 26 of the cross brace 19 have multiple roller units 96 supported thereabove, in the same manner that the roller units 70 are supported above the portions 26 of the rear cross brace 18. The multiple roller units 96 are identical in construction with the roller units 70, but may be either larger or smaller than said roller units 70.

Flat sill members 97 extend longitudinally of the frame 15, between and adjacent the frame sides 16, and are supported on and secured to the top portions 24 of the cross braces 18 and 19 and to adapter elements 98, as seen in FIGURE 5, which are mounted on the cross brace 20. Said sill members are secured to the parts 24 and 98 by fastenings 99 and are disposed substantially coplanar. Guide members 100 may be suitably secured to the undersides of the sills 97 and project inwardly therefrom between the cross braces 18 and 19.

Said guide members 100 have forwardly converging cushioned inner edges forming guide rails 101.

A rope or cable, not shown, can be extended rearwardly from the winch 51 over the trailer 14 and to beyond the rear end thereof for attachment to a boat, not shown, to be loaded onto the trailer. For this purpose, the trailer can be backed into the water so that the boat, while afloat, can be loaded onto the trailer. The latch 43 is released, as heretofore described, so that the trailer frame can pivot about the axle 33 relative to the tongue 40 to assume a downwardly and rearwardly inclined position, as seen in FIGURE 2. Normally, the trailer tongue 40 will be supported in an elevated position at its forward end by its connection to the draft vehicle. However, irrespective of this, the trailer frame may be rocked to any desired extent about the axle 33 relative to the tongue 40.

As the boat is pulled forwardly toward the rear end of the trailer 14 by operation of the winch 51, the keel of the boat will initially engage and ride onto the roller 68 and the prow of the hull will engage between the multiple roller units 70 and will ride thereon. Said roller units 70 will center the boat relative to the trailer. As the boat is drawn forwardly, the forward end of the keel will engage the roller 95 and the sides of the prow will move into engagement with and ride on the roller units 96. As the boat is drawn further forward on the trailer 14, the forward end of the boat keel will engage and ride over the rollers 67 which are in elevated positions relative to the plane of the trailer frame 15, due to the fact that the tongue 40 is unlatched and the frame is tilted downwardly and rearwardly. By the time that the boat keel engages the rollers 67 the chines of the boat will have contacted the padded cradle block members 87 which will rock to conformably engage the boat chines as the boat is pulled forward relative to the trailer. Portions of the chines will also ride on the rollers 88 which are adjusted for engagement therewith. As the boat approaches a fully loaded position the forward end of the keel may engage and ride over the roller 60, depending upon the extent that the frame 15 is tilted relative to the tongue 40. When the boat has reached a fully loaded position on the trailer 14 the weight on the trailer frame will be approximately balanced over the axle 33 so that the forward end of the frame 15 can be swung downwardly toward the tongue 40. In so moving, the rollers 67 will move downwardly relative to the plane of the frame sides 16 permitting the bow of the boat to swing downwardly until the sides of the hull at the bow come to rest on the padded forward cradle block elements 59. When this occurs a part of the keel will usually come to rest in the forward roller 60. This downward rocking movement of the boat relative to the trailer frame 15 is about the axis of the transversely aligned pivots 86.

When loading a boat from the water where there is a cross current or cross wind, it is frequently difficult to prevent the stern of the boat from swinging laterally out of alignment with the trailer frame 15. For this reason, the cushioned guide rails 101 are provided so that the prow of the boat can engage one or the other of said rails 101 for guiding the bow of the boat correctly into engagement with the roller 95 and the multiple rollers 96. As previously stated, the trailer 14 is especially designed for supporting boats having V-shaped hulls which can conveniently ride on the roller assemblies supported by the cross members 18 and 19, and so that the boat will be supported primarily upon the roller assemblies of the trailer, additionally including the rollers 67 and the roller 60, until the boat is in substantially a fully loaded position. Similarly, a boat can be readily launched from the trailer 14 by unlatching the trailer frame 15 from the tongue 40 so that the frame can be tilted, as seen in FIGURE 2. After the boat has been displaced only a short distance rearwardly relative to the trailer frame, the boat will be supported almost entirely by the roller assemblies so that it can be readily launched from the rear end of the frame 15.

Various modifications and changes are contemplated and may be resorted to, without departing from the function or scope of the invention as hereinafter defined by the appended claims.

I claim as my invention:

1. A boat trailer comprising an elongated frame having a forward end, a running gear on which said frame is supported for rocking movement about an axis disposed crosswise of the frame, a draft tongue extending forwardly from the frame, means detachably latching an intermediate portion of the tongue to the underside of a forward portion of the frame, means pivotally connecting said tongue to the frame about an axis disposed crosswise of the frame and between the pivotal axis of the frame and said forward frame end for upward rocking movement of the forward part of the frame about the running gear and relative to the tongue, and a roller assembly mounted on and carried by a part of the draft tongue located behind and spaced from the tongue pivot for swinging movement with said part of the tongue upwardly above the plane of the frame into a load supporting position when said frame is tilted relative to the tongue.

2. A boat trailer as in claim 1, a pair of elongated chine engaging cradle blocks, means pivotally and adjustably supporting said cradle blocks above rear corners of the frame, a pair of elongated bow supporting cradle blocks, and means for pivotally and adjustably supporting said last mentioned cradle blocks above the forward end of the frame and in laterally spaced relation to one another.

References Cited in the file of this patent

UNITED STATES PATENTS

| | | |
|---|---|---|
| 1,021,579 | Doolittle et al. | Mar. 26, 1912 |
| 1,461,535 | McGowan et al. | July 10, 1923 |
| 1,538,052 | Mueller | May 19, 1925 |
| 1,580,615 | Landahl | Apr. 13, 1926 |
| 2,561,708 | Milik | July 26, 1951 |
| 2,568,174 | Staacke | Sept. 18, 1951 |
| 2,815,851 | Yoshimura | Dec. 10, 1957 |
| 2,816,672 | Facchini | Dec. 17, 1957 |
| 2,835,401 | Byrd | May 20, 1958 |
| 2,860,792 | Nelson et al. | Nov. 18, 1958 |
| 2,901,138 | Whalen | Aug. 25, 1959 |